United States Patent
Johnson

[11] Patent Number: 5,944,051
[45] Date of Patent: Aug. 31, 1999

[54] SPRINKLER DRAIN AND TEST VALVE

[76] Inventor: Augustus W. Johnson, 70 W. 51st St., Hialeah, Fla. 33012

[21] Appl. No.: 08/937,618

[22] Filed: Sep. 25, 1997

[51] Int. Cl.⁶ ..................................................... F16K 5/10
[52] U.S. Cl. ........................ 137/559; 251/208; 251/297; 251/207; 73/168
[58] Field of Search ............................ 137/559; 251/297, 251/207, 208, 206; 73/168

[56] References Cited

U.S. PATENT DOCUMENTS

| | | |
|---|---|---|
| 350,510 | 10/1886 | Stretch . |
| 421,224 | 2/1890 | Applegarth . |
| 926,774 | 7/1909 | Schmidt . |
| 1,056,344 | 3/1913 | Lester . |
| 1,229,038 | 6/1917 | Cornelius . |
| 1,264,775 | 4/1918 | Coles . |
| 1,333,048 | 3/1920 | Webster . |
| 1,666,918 | 4/1928 | Scoville . |
| 1,757,237 | 5/1930 | Deutsch . |
| 1,825,512 | 9/1931 | Durham et al. . |
| 2,621,012 | 12/1952 | Graham . |
| 2,660,560 | 11/1953 | Pichard . |
| 2,859,611 | 11/1958 | Morse . |
| 3,090,564 | 5/1963 | Gilmour ................................. 251/207 |
| 3,115,896 | 12/1963 | Roberts et al. .......................... 251/207 |
| 3,134,405 | 5/1964 | White et al. ............................. 251/207 |
| 3,386,461 | 6/1968 | Fisher . |
| 3,517,554 | 6/1970 | Smith . |
| 3,817,097 | 6/1974 | Heroux . |
| 3,854,497 | 12/1974 | Rosenberg . |
| 4,130,128 | 12/1978 | Kaneko . |
| 4,244,393 | 1/1981 | Lehtinen . |
| 4,655,078 | 4/1987 | Johnson . |
| 4,852,610 | 8/1989 | McHugh . |
| 4,971,109 | 11/1990 | McHugh . |
| 5,090,447 | 2/1992 | Lewis et al. ............................. 137/559 |
| 5,406,979 | 4/1995 | McHugh ................................. 137/559 |

*Primary Examiner*—A. Michael Chambers
*Attorney, Agent, or Firm*—Dority & Manning, P.A.

[57] ABSTRACT

A sprinkler drain and test valve for testing sprinkler systems including a housing, an inlet and outlet disposed on either end of the housing, a ball disposed within the housing between the inlet and the outlet having three channels extending therethrough that provide communication between the inlet and outlet. A pressure relief valve is carried within one of the channels for opening the flow through the valve when a pressure from fluid flow exceeds a predetermined pressure when the valve is in the first position and for blocking fluid flow when the valve is in a hydrostatic test angular position.

9 Claims, 8 Drawing Sheets

SPRINKLER DRAIN AND TEST VALVE

BACKGROUND OF THE INVENTION

This invention relates to a rotary valve and more particularly to a rotary valve for draining and testing sprinkler systems.

Rotary valves, such as disclosed in U.S. Pat. No. 4,655,078 and U.S. Pat. No. 4,971,108 have been incorporated in sprinkler systems so that the operation of the sprinkler systems can be routinely checked. These rotary valves normally incorporated an actuator handle that is connected directly to a ball member carried within the valve housing. By rotating the actuator arm, the ball valve can be rotated so that different sized passages provide communication between the inlet and outlet of the valve. In normal operation, it was desirable that one passage would permit the flow of water corresponding to the flow of one sprinkler head being activated. The other passage, as shown in U.S. Pat. No. 4,655,078, was of a larger diameter to permit the sprinkler system to be drained by aligning the passage with the inlet and outlet opening of the valve. The valve could also be rotated to a shut-off position where no water was permitted to flow between the inlet and outlet.

Normally the valve is installed in communication with a conduit forming part of the sprinkler system. The test conduit in which the test valve is carried extends from the conduit of the sprinkler system to a drain. During the testing operation, water flows from the conduit of the sprinkler system through the test valve to any suitable drain. It is desirable that sprinkler systems be equipped with a pressure relief valve system so that if the pressure built up within the sprinkler system exceeds a pre-determined pressure then the flow of water would be directed to the drain. In one attempt to solve this problem, a bypass conduit which has a pressure relief valve interposed therein is connected between the inlet and outlet of the test valves being used in the sprinkler system. One problem with this system is that it requires additional plumbing and it must be disconnected when the sprinkler system is being hydrostatically tested at pressures higher than set on the relief valve. This is not a satisfactory solution since the conduit system which includes the check valve is not in place when the system is being hydrostatically tested. An example of one system utilizing a relief valve is manufactured by AGF Manufacturing Company, Model 1011 and Model 3011.

SUMMARY OF THE INVENTION

The invention pertains to a sprinkler drain and test valve for testing a sprinkler system. The test valve includes a valve housing having an inlet opening and an outlet opening and defining a fluid flow path therebetween. A ball valve member is carried in said fluid flow path of said housing and is rotatable about an axis. An actuator is provided for rotating said ball valve member to discreet angular positions within said housing. The ball valve member has at least three channels extending therethrough. A relief valve is carried in a first of said channels for opening when fluid pressure flow exceeds a pre-determined pressure while said ball valve is in a first angular position and for blocking fluid flow when said ball valve is in a hydrostatic test angular position so that the sprinkler system can be hydrostatically tested. A second channel is provided in said ball valve providing communication between said inlet opening and said outlet opening when said ball valve is in a second angular position for permitting fluid flow through said valve of a first volume. A third channel provides communication between said inlet opening and said outlet opening when the ball valve is in a third angular position for permitting fluid flow through the valve of a second volume. Thus, by manipulating the actuator, the sprinkler system can be tested for fluid flow as well as fluid pressure.

DESCRIPTION OF THE PREFERRED EMBODIMENTS

Figure 1:
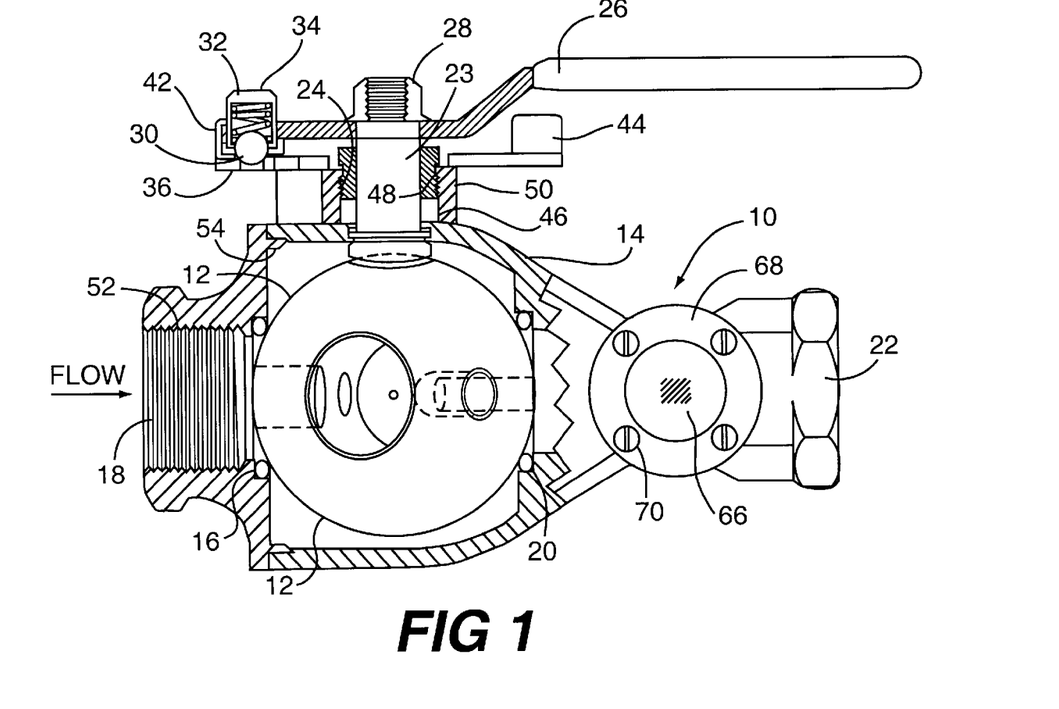
FIG. 1 is a side view of a valve constructed according to the present invention.
Figure 2:
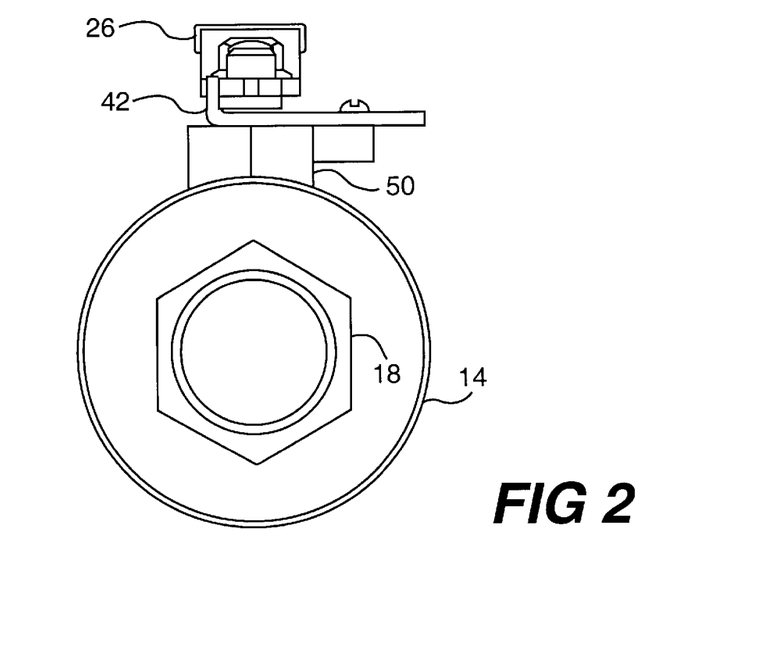
FIG. 2 is a front view of the invention.

Referring in more detail to FIG. 1 of the drawings, there is illustrated a sprinkler drain and test valve 10 that has a ball valve 12 enclosed within a housing 14. A seal 16 is carried within the housing to seal the ball valve 12 from an inlet port 18. Another seal 20 is provided between the ball valve 12 and an outlet passage 22 to provide a seal between the housing adjacent the outlet 22 and the ball valve 12. The ball valve 12 has a stem 23 connected thereto which extends out of the top of the housing through a bushing 24. The upper end of the stem 23 is secured to an actuator 26 which is in the shape of an arm. A nut 28 is carried on top of the stem 23 for securing the actuator to the stem. A spring-loaded ball 30 is carried adjacent one end of the arm 26 and is pressed downwardly by means of a spring 32 carried within a housing 34. A detente plate 36 is secured to the housing in a fixed position and has holes provided therein which form detentes at pre-determined angular positions for enabling the ball valve member to be rotated to positive angular positions by manipulating the handle 26.

Figure 7:
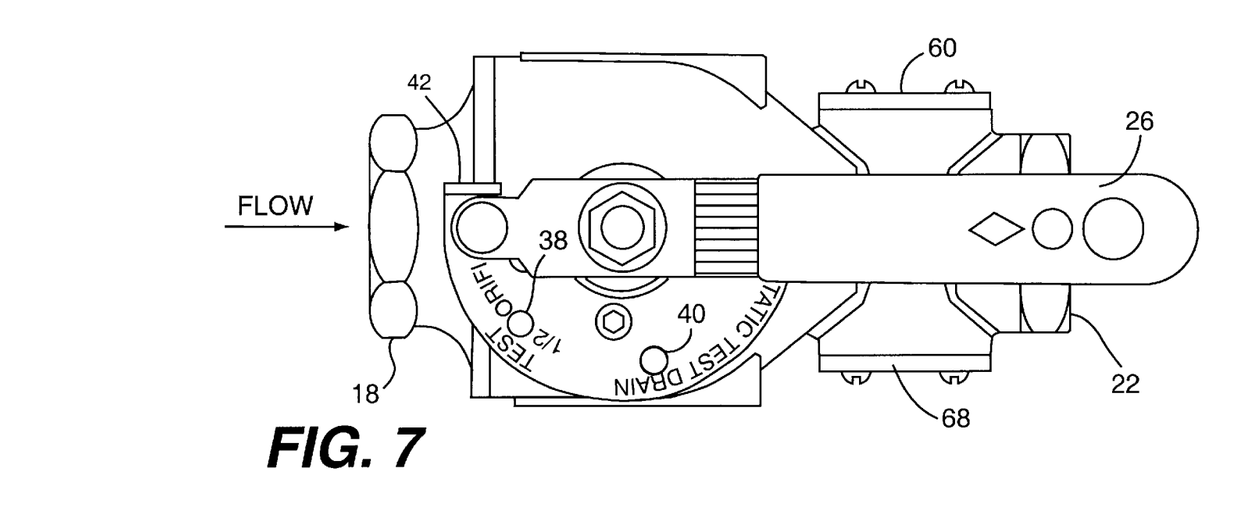
FIG. 7 is a top view illustrating the actuator handle in the "off" position.
Figure 8:
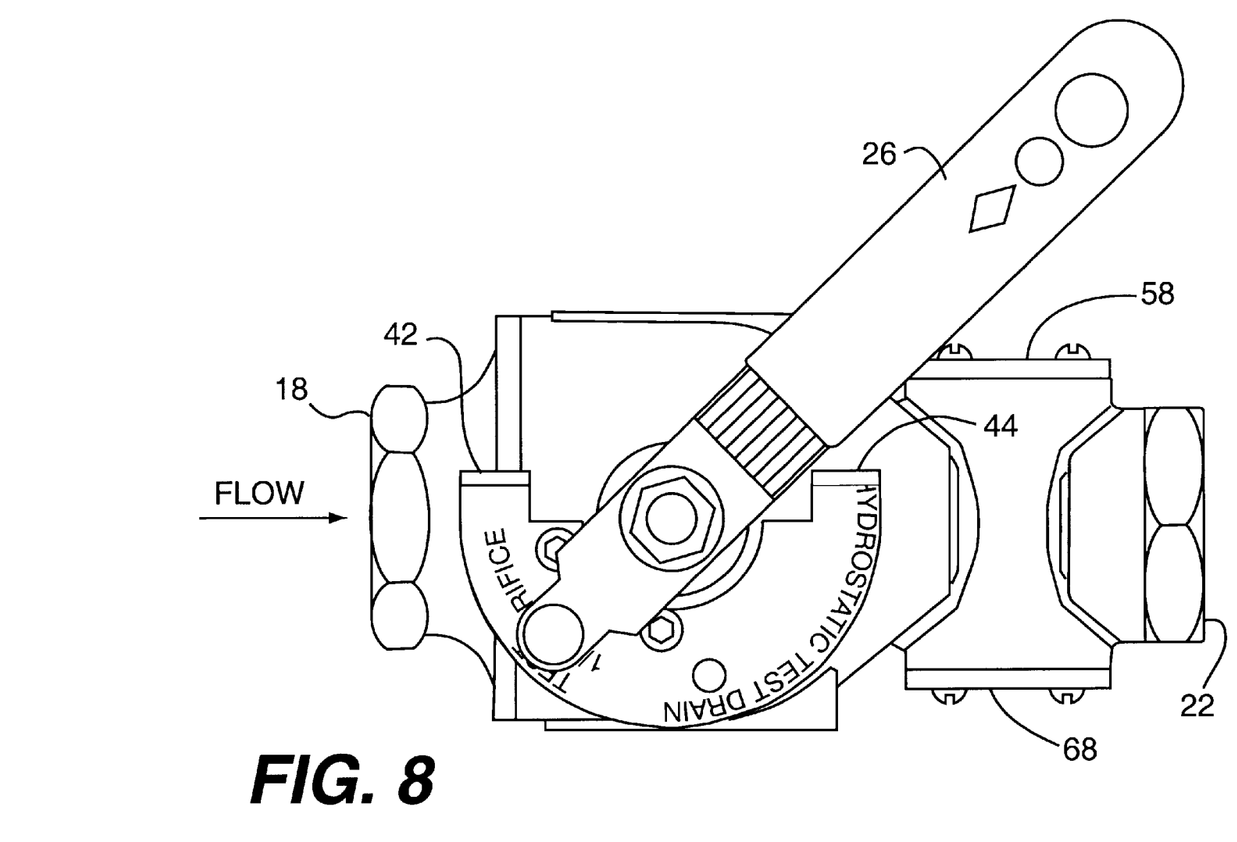
FIG. 8 is a top view illustrating the actuator handle of the valve in a test position.
Figure 9:
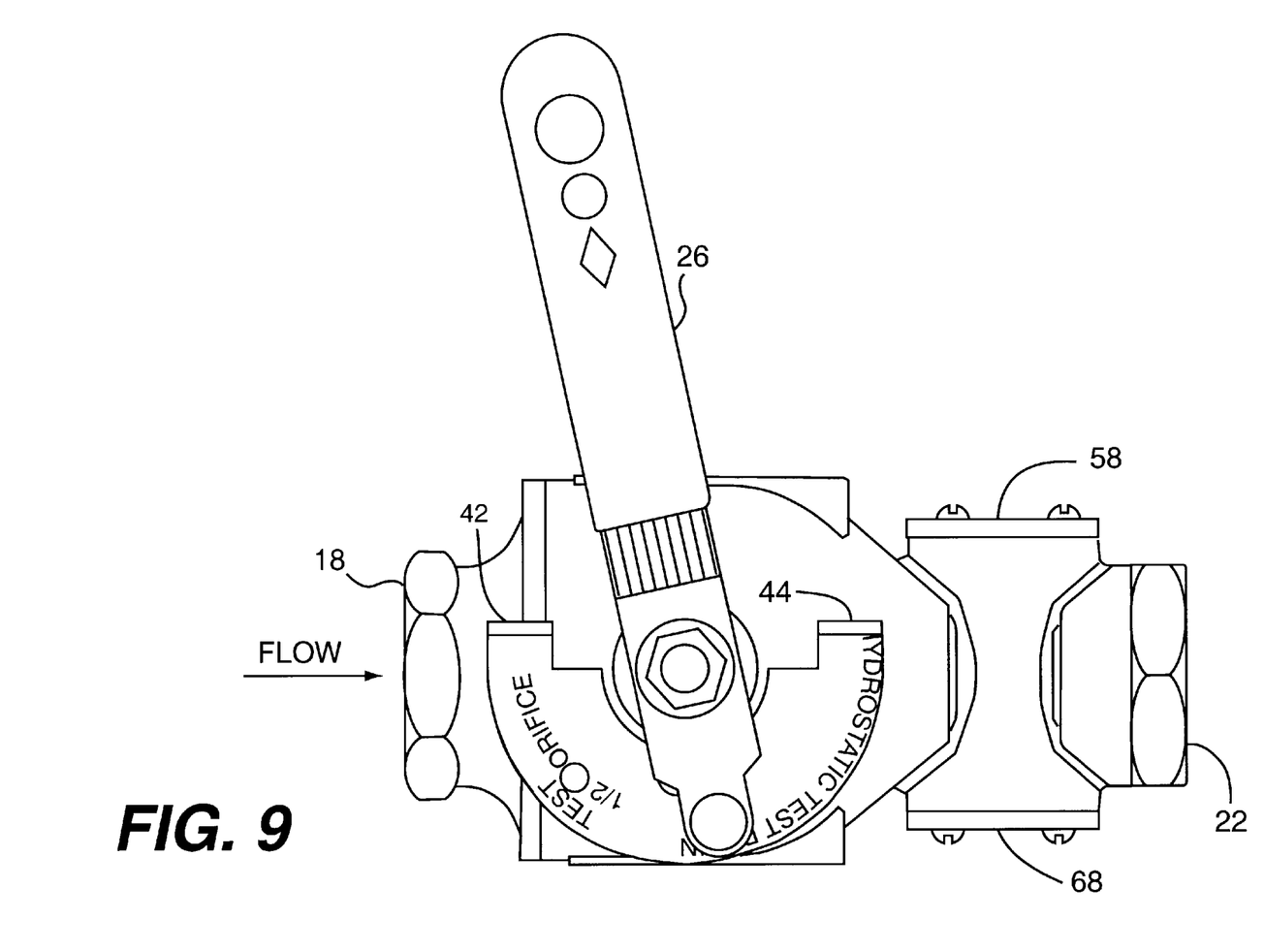
FIG. 9 is a top view illustrating the actuator handle in the drain position.
Figure 10:
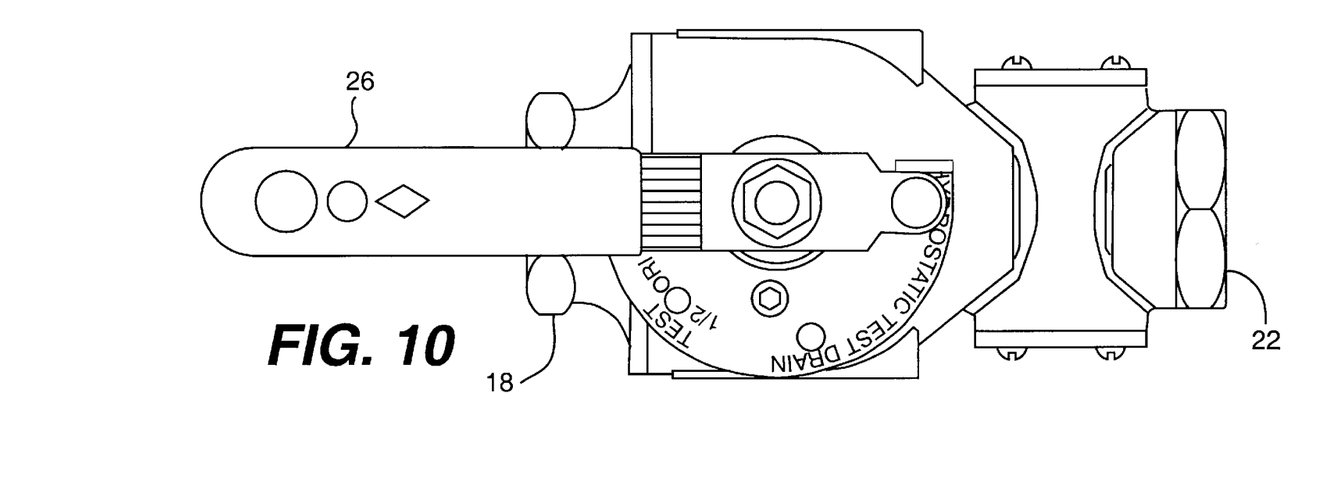
FIG. 10 is a top view illustrating the actuator handle in a hydrostatic test position.

As seen in FIGS. 7 and 8, the first detente 38 is labeled "test position". The second detente 40 is labeled "drain position". The position such as shown in FIG. 7 is the "off" position and such occurs when the end of the arm 26 abuts against a flange 42 for limiting the movement of the arm in one direction. When the arm is rotated in the counterclockwise direction to a position 180° from the "off" position shown in FIG. 7 to a hydrostatic test position such as shown in FIG. 10, the end of the arm abuts against a flange 44 carried on the detente plate 36.

A seal 46 encircles the stem 23 adjacent the outer surface of the housing to provide a seal between the stem and the housing. The seal is held in place by the threaded bushing 24 that threads within a cylinder 50 extending upwardly from the housing.

The inlet to the valve has threads 52 provided on the inner surface thereof so that a threaded pipe can be screwed therein. The inlet member 18 is in turn threaded into the main portion of the housing by threads 54 carried on an inwardly projecting flange forming part of the inlet member 18. The outlet 22 also has a threaded inside 56 into which a pipe can be threaded.

Interposed between the outlet 22 and the main housing is a viewing glass 58 that is secured to the outlet side of the housing by means of a circular plate 60. A seal 62 is provided between the inner surface of the viewing glass and a flange 64 provided in the outlet. In the embodiment illustrated, there are two viewing glasses 58 and 66. The viewing glass 66 is also secured to the outlet housing by means of a circular ring member 68 that is attached to the housing by threaded bolts 70. Seals 72 are provided between the inside surface of the viewing glass 66 and flanges 74 forming part of the outlet portion of the housing. As a result of the construction shown and described, the entire valve is sealed so that when high pressure testing of the valve takes place, no leakage occurs through any of the fittings or joints in the housing.

Figure 3:
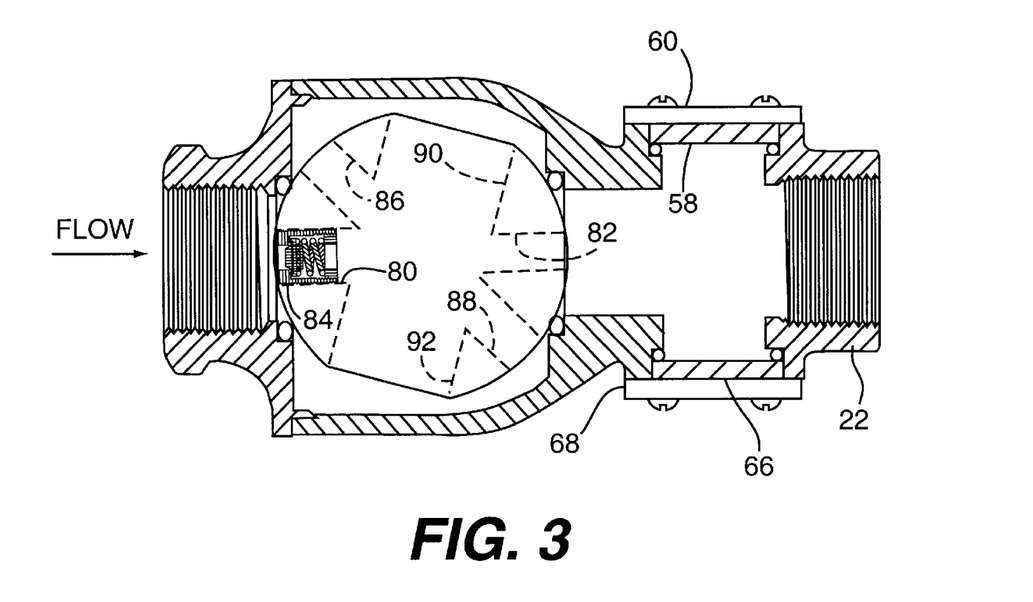
FIG. 3 is a sectional view showing the valve in the "off" or normal position.

There are three distinct channels provided in the ball valve 12 which permit communications between the inlet and outlet of the valve. The first channel is defined by two passages 80 and 82 which are diametrically opposed from each other. In passage 80, there is a relief valve 84 which is biased to the left as shown in FIG. 3 by a spring so that it does not open until the pressure exceeds a pre-determined pressure such as 175 psi.

A second channel is defined by diametrically opposed passages 86 and 88. When these passages are in line with the inlet and outlet by rotating the actuator handle 26 to the test position fluid is allowed to flow through the valve of a first pre-determined volume which normally corresponds to the water flow that would be required by a single sprinkler head being opened.

A third channel is defined by diametrically opposed passages 90 and 92 so that when the ball is rotated to a position where the passages 90 and 92 are in line with the inlet 18 and outlet 22 the fluid within the sprinkler system is allowed to drain through the valve. This is referred to as the drain position.

Figure 6:
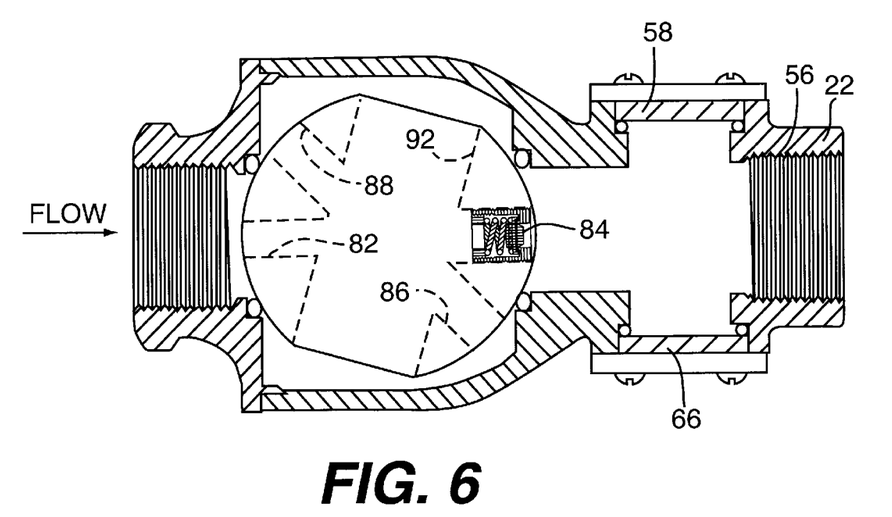
FIG. 6 is a sectional view illustrating the valve in hydrostatic test position.

The fourth angular position of the valve is shown in FIG. 6 and in this position the passage 82 is in line with the inlet port 18 and the passage 80 is in alignment with the outlet 22. In the position shown in FIG. 6, no water can flow through the valve and it is possible to perform hydrostatic tests on the sprinkler system with pressures that exceed the pressure rating for the relief valve 84 since the relief valve only allows fluid to flow in one direction therethrough. When the relief valve is in the position such as shown in FIG. 6, no fluid can flow therethrough regardless of the pressure whereas when the relief valve is in the position shown such as in FIG. 3 if a pressure on the inlet is greater than for example 175 psi then fluid flows through the valve.

Figure 11:
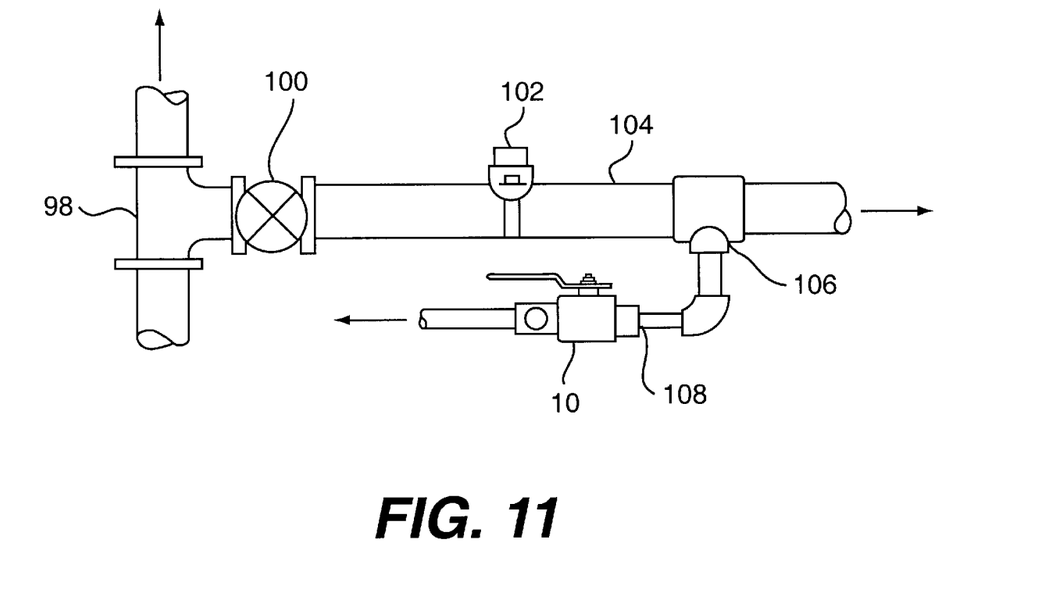
FIG. 11 is a schematic diagram of a portion of the sprinkler system illustrating the valve of the invention connected thereto.

FIG. 11 depicts the drain and test valve of the present invention, as disposed in a portion of a sprinkler system. The depicted portion of the sprinkler system comprises system riser 98, indicating type flow control valve with a supervisory switch 100, water flow switch 102, feed main 104, shunt 106, and drain and test conduit 108. The drain and test valve 10 of the present invention is affixed by virtue of pipe threads into conduit 108. After passing through drain and test valve 10, water continues through drain and test conduit 108 to a drain.

Figure 12:
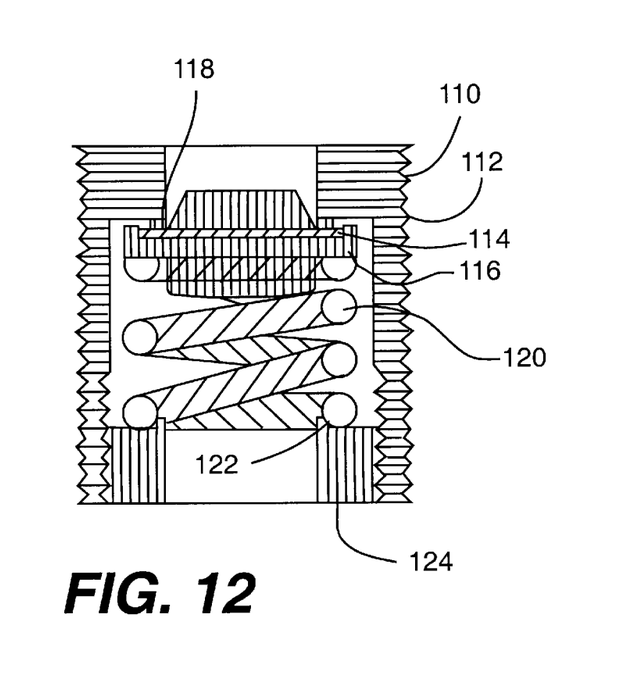
FIG. 12 is a sectional view of the relief valve being used.

Any suitable relief valve can be used with the drain and test valve and one suitable valve is shown in FIG. 12. The valve includes a brass body 110 that has threads provided on the other surface thereof so that it can be threadably screwed into the passage 90 of the valve. A neoprene washer 114 is provided between a brass insert 116 and protrusions 118 carried on a circular flange of the brass body 110. A stainless steel spring 120 presses against the side of the brass insert opposite the neoprene washer for forcing the brass insert by means of the neoprene washer against the circular flange 118 to produce a seal therebetween. The lower end of the spring 120 rests within a circular flange 122 carried on an inner surface of a brass spring tension nut 124 that is threaded into the lower end of the brass body 110.

The tension of the spring may be varied depending on at what pressure it is desired to allow flow in one direction through the relief valve. As shown in FIG. 12, the relief valve opens when the pressure on top of the brass insert exceeds a pre-determined pressure and in one particular embodiment, this is 175 pounds of pressure. Water cannot flow from the lower side of the relief valve as shown in FIG. 12 to the top side at any time since the pressure of the water would press the brass insert by means of the neoprene washer 114 against the circular rim 118.

In operation, the sprinkler drain and test valve is connected in shunt with the feed main 104 that supplies water to the sprinkler system for a building. In normal operation, the test valve is in the position as shown in FIG. 3 and FIG. 7 wherein the inlet side of the valve 18 is in communication with the shunt 106. As long as the pressure for the sprinkler system is below 175 psi no water flows through the valve. However, if for some reason there is a pressure build-up of above 175 psi in the sprinkler system, the relief valve 84 as shown in FIG. 3 will be moved to the right and water would be allowed to flow through the valve to the drain.

When it is desired to perform hydrostatic tests on the sprinkler system wherein the pressure within the sprinkler system can be increased to above 200 psi or more, the actuator handle 26 is rotated to the position wherein the ball valve assumes the position shown in FIG. 6 and 10. In this position, the pressure relief valve 84 will prevent any flow through the valve since the pressure is being applied to the relief valve to maintain it in a closed non-flow position.

Figure 4:
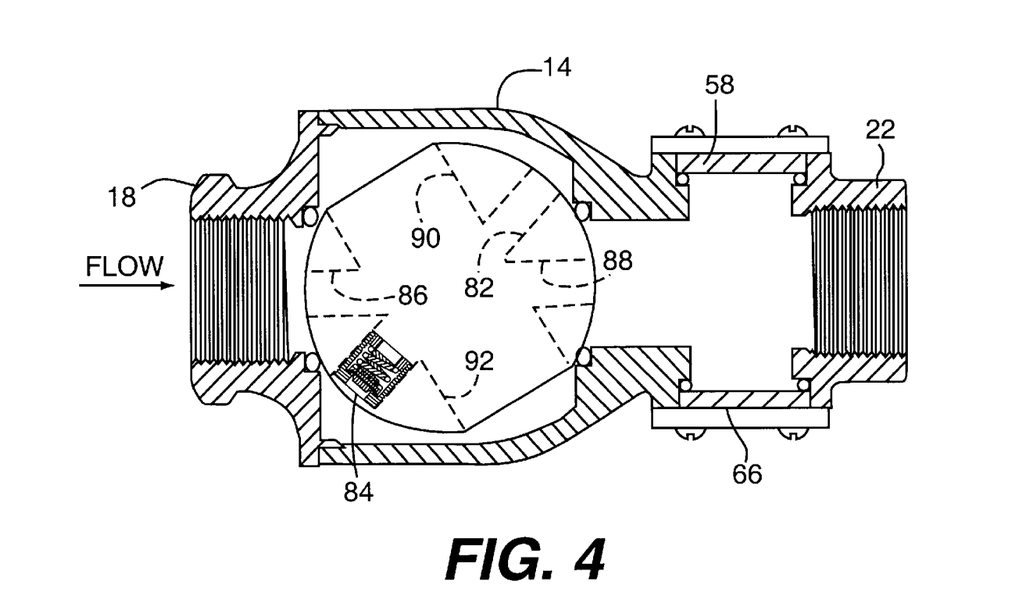
FIG. 4 is a sectional view showing the valve in a first test position wherein fluid flow of the valve is of a first volume.

In order to test the flow of fluid through the valve to conduct a test of the sprinkler system, the actuator arm 26 is moved to the position shown in FIG. 4 and FIG. 8. In this position, water is allowed to flow through the valve at a volume corresponding to the normal volume that a single sprinkler head would require when activated. A person conducting the test would view the flow of water through the valve by looking through the glass windows 58 and 60.

Figure 5:
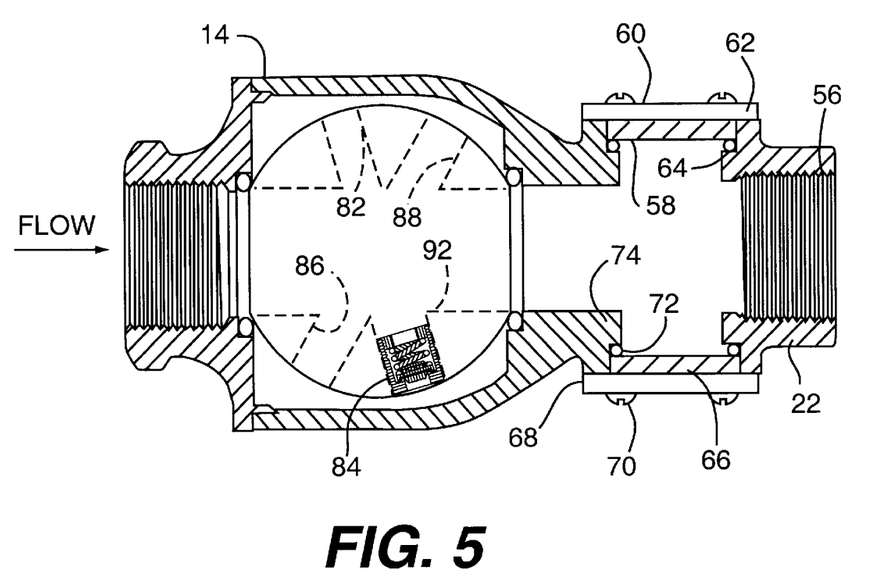
FIG. 5 is a sectional view illustrating the valve of the invention in a drain position.

Sometimes, it is desirable to drain the entire sprinkler system and in order to perform this task the actuator handle 26 is rotated to the positions shown in FIGS. 5 and 8. In this position, the valve is fully open to allow flow through the inlet and out of the outlet to the drain for draining all of the fluid from the sprinkler system.

Figure 13:
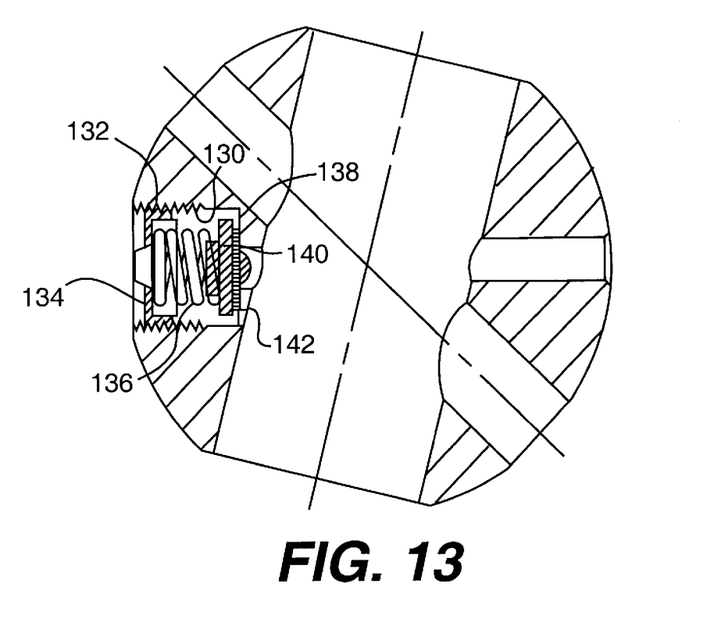
FIG. 13 is a sectional view illustrating a relief valve built into the ball housing.

In one particular instance, the relief valve is built into the passage, for example, as shown in FIG. 13, a bore 130 is drilled into the ball and the outer portion thereof such as shown in 132 is threaded. A brass disc 134 is threaded in the outer end of the passage and has a spring 136 mounted thereagainst which in turn presses against the lower side of the brass insert 138. The other side of the brass insert presses against a neoprene washer 140 which in turn presses against a flange 142 extending about the passage. The brass disc has a slot provided therein so that it can be rotated for adjusting the pressure of the relief valve.

Figure 14:
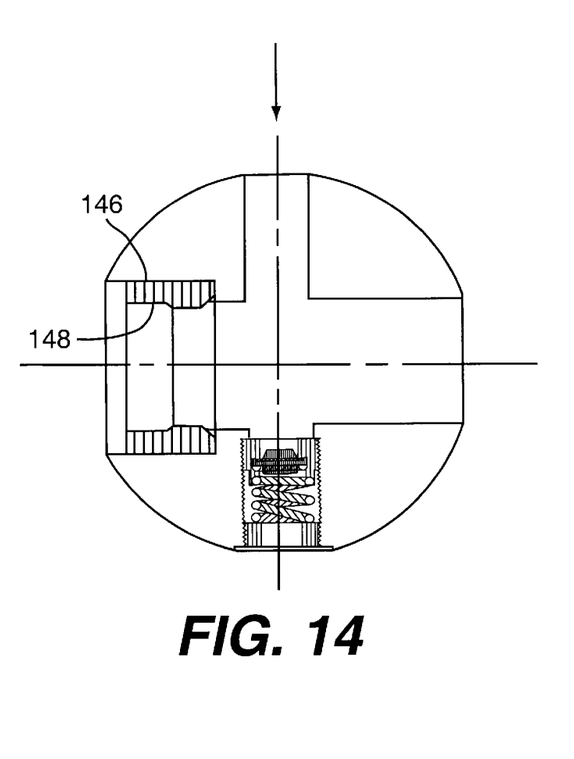
FIG. 14 is a sectional view of a relief valve and insert carried within the ball of a valve.

Since sprinkler heads of different manufacturers vary with regard to the volume of water that is allowed to flow therethrough when activated, it has been determined that inserts such as shown in FIG. 14 of various diameter passages can be used with the sprinkler drain and test valve. For example, as shown in FIG. 14, an insert 146 having a pre-determined internal diameter bore 148 can be threaded in one of the passages on the valve. By changing the insert, one can allow the flow through bores having a 0.7 inch diameter, 0.625 inch diameter, 0.531 inch diameter, 0.50 inch diameter, 0.4375 inch diameter and 3.75 diameter. The particular threaded insert selected is to allow a flow of water corresponding to the requirement of one sprinkler head when activated.

Having thus described the invention in terms of a preferred embodiment, it will be readily apparent to those skilled in the art that many modifications and variations may be introduced without departing from the invention scope of the present invention.

What is claimed:

1. A sprinkler drain and test valve for testing a sprinkler system comprising:

a valve housing having an inlet opening and an outlet opening and defining a fluid flow path there between, a ball valve member carried in said fluid flow path of said housing and rotatable about an axis, and an actuator for rotating said ball valve member to discrete angular positions within said housing, said ball valve member having at least three channels through said valve member, a relief valve carried in a first of said channels for opening when pressure from fluid flow exceeds a pre-determined pressure while said ball valve is in a first angular position and for blocking fluid flow when said ball valve is in a hydrostatic test angular position so that said sprinkler system can be hydrostatically tested, said second channel providing communication between said inlet opening and said outlet opening when said ball valve is in a second angular position for permitting fluid flow through said valve of a first volume, and said third channel providing communication between said inlet opening and said outlet opening when said ball valve is in a third angular position for permitting fluid flow through said valve of a second volume whereby by manipulating said actuator said sprinkler system can be tested for fluid flow as well as fluid pressure.

2. The sprinkler drain and test valve as set forth in claim 1 wherein:

said first angular positions and said hydrostatic test angular position are 180 degrees from each other.

3. The sprinkler drain and test valve as set forth in claim 1, further comprising:

a sight glass carried in said valve housing for viewing fluid flow through said housing during testing.

4. The sprinkler drain and test valve as set forth in claim 1 wherein each of said channels extend in a straight line through said ball valve member.

5. The sprinkler drain and test valve as set forth in claim 3 wherein said entire sprinkler and test valve and said sight glass are an integral structure.

6. The sprinkler drain and test valve as set forth in claim 1 wherein said actuator includes an elongated arm, a spring loaded ball carried adjacent one end of said arm, a detente plate carried by said valve housing having detentes at pre-determined angularly positions thereon for enabling said ball valve member to be rotated to positive angular positions during testing of said sprinkler system.

7. The sprinkler drain and test valve as set forth in claim 4 wherein said channels include two passages.

8. The sprinkler drain and test valve set forth in claim 1 further comprising:

an insert carried in said second channel having a bore passing therethrough of a predetermined diameter for restricting the amount of water flowing therethrough.

9. The sprinkler drain and test valve as set forth in claim 8 wherein said insert can be removed and replaced by an insert having a bore extending therethrough of a different diameter.

* * * * *